US006966428B1

(12) United States Patent
Flynn

(10) Patent No.: US 6,966,428 B1
(45) Date of Patent: Nov. 22, 2005

(54) METHOD AND APPARATUS FOR TRANSFERRING ARTICLES FROM A FIRST POSITION TO A SECOND POSITION

(75) Inventor: Robin L. Flynn, Waterville, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 106 days.

(21) Appl. No.: 10/746,450

(22) Filed: Dec. 24, 2003

(51) Int. Cl.[7] .......... B65G 25/00

(52) U.S. Cl. .......... 198/468.01; 198/457.06; 198/813

(58) Field of Search .......... 198/457.06, 457.07, 198/468.01, 808, 812, 813; 65/260

(56) References Cited

U.S. PATENT DOCUMENTS

| | | | | | |
|---|---|---|---|---|---|
| RE28,947 | E | * | 8/1976 | Bowman | 65/348 |
| 4,494,973 | A | | 1/1985 | Perry | |
| 4,525,195 | A | | 6/1985 | Foster | |
| 4,568,371 | A | * | 2/1986 | Nebelung et al. | 65/241 |
| 4,699,016 | A | * | 10/1987 | Moll | 74/417 |
| 5,160,015 | A | * | 11/1992 | Perry et al. | 198/468.01 |
| 5,207,114 | A | * | 5/1993 | Salisbury et al. | 74/479.01 |
| 5,271,757 | A | | 12/1993 | Houben et al. | |
| 5,365,797 | A | * | 11/1994 | McCrory, III | 73/862.44 |
| 5,425,794 | A | | 6/1995 | Frederick et al. | |
| 5,429,651 | A | * | 7/1995 | Bolin | 65/241 |
| 5,587,000 | A | | 12/1996 | Mann et al. | |
| 5,895,513 | A | | 4/1999 | Ciriello et al. | |
| 6,009,727 | A | * | 1/2000 | Grant et al. | 65/359 |
| 6,076,654 | A | | 6/2000 | Leidy | |
| 6,241,448 | B1 | | 6/2001 | Nicholas | |
| 6,367,287 | B1 | * | 4/2002 | Leidy et al. | 65/160 |
| 6,702,097 | B1 | * | 3/2004 | Leidy et al. | 198/468.01 |
| 6,722,488 | B2 | * | 4/2004 | Gerber et al. | 198/468.2 |
| 6,736,256 | B2 | * | 5/2004 | Jobin | 198/457.06 |

FOREIGN PATENT DOCUMENTS

| | | | | |
|---|---|---|---|---|
| EP | 0 118 300 | * | 9/1984 | C03B/9/44 |

* cited by examiner

*Primary Examiner*—Douglas Hess

(57) ABSTRACT

A takeout arm assembly (10) for an I.S. glass container forming machine, the arm assembly having a housing (14) that is oscillatable about a fixed shaft (12). The housing has a split first pulley (16*a*/16*b*) that is coaxial with the fixed shaft and oscillatable with the housing, and a second pulley (18) that is positioned within and is rotatable with respect to the housing, the second pulley being spaced from the first pulley with the axes of the first and second pulleys being parallel to one another. A double-ended first cable is trained in untoothed peripheral grooves around the first half (16*a*) of the first pulley and the second pulley with its opposed ends respectively secured at spaced locations to a first half of the first pulley and the second pulley (18), and a double-ended second cable is trained in untoothed peripheral grooves around the second half (16*b*) of the first pulley with its opposed ends respectively secured at spaced locations to the second half of the first pulley and the second pulley (18). The halves of the first pulley are circumferentially variable with respect to one another to permit independent adjustment of tension levels in the first and second cables.

12 Claims, 2 Drawing Sheets

METHOD AND APPARATUS FOR TRANSFERRING ARTICLES FROM A FIRST POSITION TO A SECOND POSITION

FIELD OF THE INVENTION

This invention relates to a method of and an apparatus for transferring articles from a first position to a second position by a pivoting motion that does not change the angular orientation of the articles during transfer. More particularly, this invention relates to a method of and an apparatus of the aforesaid character for transferring one or more freshly-formed glass containers from a blow molding position of a glass container forming machine of the individual section (I.S.) type to a deadplate of the machine to begin cooling while awaiting further transfer to a removal conveyor.

BACKGROUND OF THE INVENTION

As is explained, for example, in commonly assigned U.S. Pat. No. 6,076,654 (Leidy) and U.S. Pat. No. 6,241,448 B1 (Nicholas), the disclosure of each which is incorporated by reference herein, or as is otherwise known, most glass containers are manufactured by a machine type known as an I.S. machine. Containers are manufactured by an I.S. machine at one or another of a multitude of machine sections, typically, 6, 8, 10 or even 12 sections, and typically 2, 3 or 4 containers simultaneously at each machine section depending on container size-and desired production rate. As a final step in the manufacture of containers by an I.S. machine, blown containers are transferred, in unison where 2 or more containers are simultaneously manufactured at a machine section, from open blow molds of the machine section in which they were formed to a nearby deadplate of the machine to permit the blown containers to partly cool before the containers are transferred to a removal conveyor for further processing.

Typically, containers are transferred from an I.S. machine section blow mold station to a deadplate by a takeout mechanism that employs a multitude of individual takeout heads suspended from an arm, one such head for each container to be transferred from the machine section. After grasping of the containers by the takeout heads, the arm of the takeout mechanism, from which the heads are supported, is turned by approximately 180° while the containers remain suspended from the heads, to position the containers over the I.S. machine deadplate. The takeout heads then release the containers to remain on the deadplate, and the arm of the takeout mechanism is then reverted by 180° to begin a repeat of the operating cycle when the next set of glass containers manufactured at the machine section is ready to be transferred.

To minimize motion of the freshly-formed glass containers during transfer, the oscillating arm of the takeout mechanism, from which the container-carrying heads or tongs are suspended, has a parallel motion mechanism to permit the containers to remain suspended from the takeout mechanism during oscillation of the head-carrying arm of the mechanism. U.S. Pat. No. 4,494,973 (Perry), which was assigned to a predecessor of the assignee of this application, the disclosure of which is also incorporated by reference herein, describes an I.S. machine oscillating takeout mechanism with a parallel motion mechanism to permit suspended containers to remain with their parallel axes vertical throughout the motion from the machine blow molds to the machine deadplate.

The parallel linkage mechanisms that are widely used in commercial I.S. machines typically use a reinforced (steel or Kevlar) polyurethane timing belt drive to act as a four bar linkage so that spaced, parallel shafts of an oscillating takeout arm maintain the same angular orientation throughout oscillation of the takeout arm about an axis of one of the shafts. This mechanism superceded chain driven parallel motion mechanisms, such as that of the aforesaid '973 patent, because chain driven mechanisms were more subject to wear than the belt-driven mechanisms that replaced them. However, the belt-driven mechanism of the type widely used has a maximum temperature rating of 185° F., and in a high temperature environment of an I.S. glass container forming machine, the temperature to which such a belt can be exposed can often exceed that temperature, possibly reaching a temperature of 225° F.–275° F., where the drive belt is much less strong than at its rated temperature.

SUMMARY OF THE INVENTION

According to the present invention there is provided a takeout mechanism for transferring articles from a first position to a second position by an oscillating motion of an article-carrying arm in which the arm is equipped with a parallel motion mechanism to ensure that the axes of the articles carried by the arm do not change in angular orientation during the transfer step. The parallel motion takeout mechanism of the present invention does not lose a significant degree of strength in environments where temperatures can exceed 185° F., and this feature makes a takeout mechanism of the present invention especially well suited for use as a takeout mechanism for transferring freshly-formed glass containers from molding locations of a glass container forming machine of the I.S. type to a deadplate of the machine.

The takeout mechanism of the present invention uses a pair of spaced wire cables that are trained around spaced, untoothed pulleys with parallel axes of oscillation. One of the pulleys is a split pulley with coaxial halves that can turn independently of each other, and the other pulley is a unitary pulley all portions of which turn simultaneously. Each of the wire cables is a double-ended cable, and each is trained around the unitary pulley at opposite sides of the axis of rotation thereof. The first cable is also trained around one half of the split pulley with one of its opposed ends secured thereto and the other of the opposed ends secured to the unitary pulley. The other cable is also trained around the other half of the split pulley with one of its opposed ends secured thereto and the other of its opposed ends secured to the unitary pulley.

The use of a split pulley for one of the spaced pulleys permits each of the cables to be independently pretensioned and independently adjusted to keep it tight. The cables may be standard, helically wound multi-wire cables, and it has been established that a pair of 5/32 inch diameter helically wound, multi-strand steel cables has sufficient strength at temperatures well in excess of 185° F. to replace a standard drive belt drive in a parallel linkage mechanism with a substantial reduction in mechanism size and weight.

Accordingly, it is an object of the present invention to provide an article transfer mechanism with an improved parallel linkage. More particularly, it is an object of the present invention to provide a transfer mechanism of the aforesaid character that is sufficiently resistant to elevated temperatures to be well-suited for use as a takeout mechanism of the type used in glass container forming machines of the I.S. type.

For a further understanding of the present invention and the objects thereof, attention is directed to the drawing and the following brief description thereof, to the detailed description of the invention and to the appended claims.

DETAILED DESCRIPTION OF THE INVENTION

Figure 1:
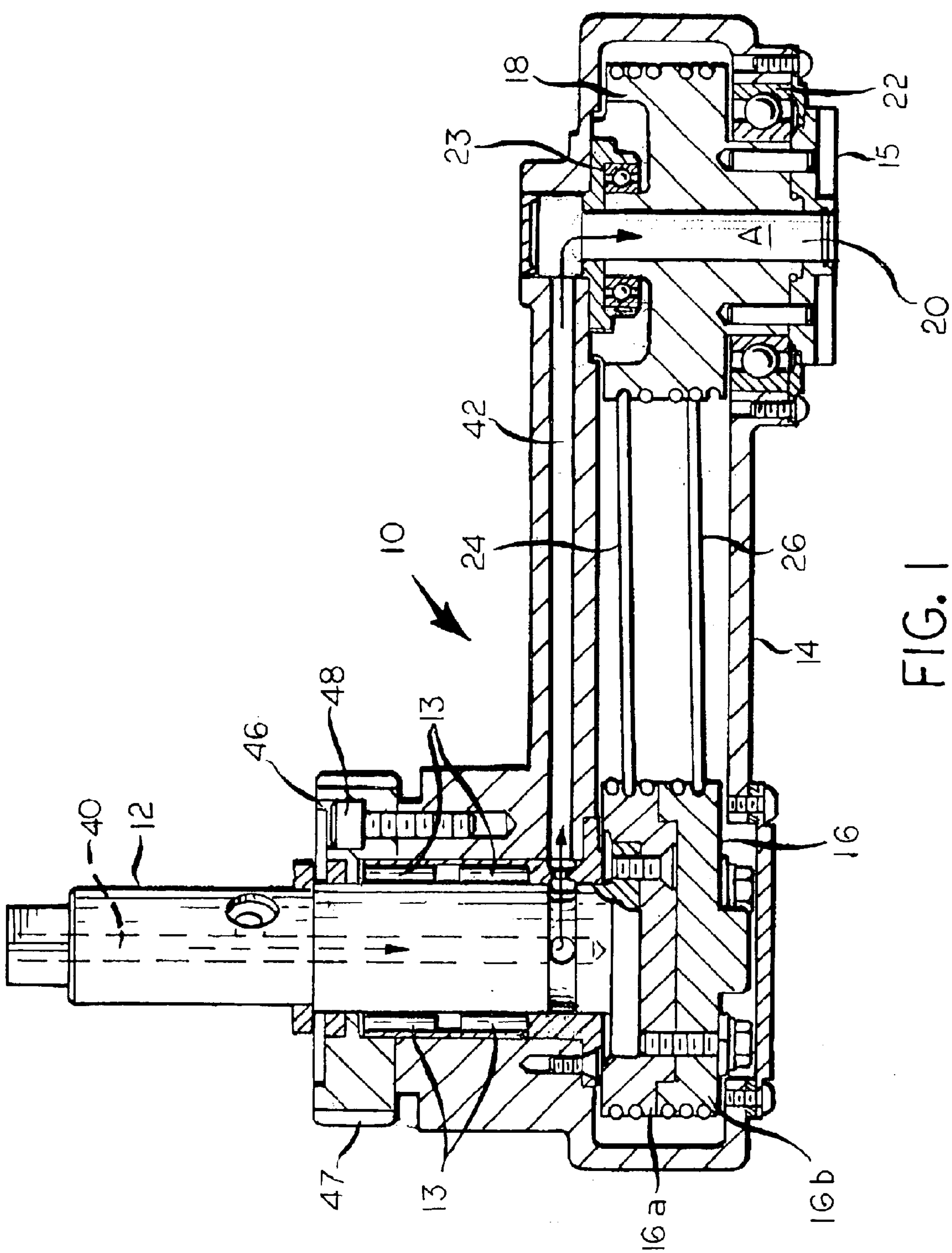
FIG. 1 is an elevational view, partly in cross-section, of an I.S. machine takeout arm with a parallel motion mechanism according to the present invention.

A takeout arm assembly according to the preferred embodiment of the present invention is indicated generally by reference number 10 in FIG. 1. The takeout arm assembly 10 includes a fixed shaft 12, which corresponds in function to the shaft 18 of the aforesaid '193 patent.

A multi-piece housing 14 is journalled on the shaft 12 by needle bearings 13 to be oscillatable with respect to the shaft 12. Located within the housing 14 is a pulley 16 with a plurality of untoothed grooves in its periphery. The pulley 16 is also oscillatable with the housing 14. A second pulley 18, which is annular and is spaced from the pulley 16, and whose central axis is parallel to that of the pulley 16, is also located within the housing 14. The pulley 18 is coaxially and rotatably positioned with respect to a bearing 22 and a bearing 23, which are mounted within the housing 14 to permit the pulley 18 to turn about the longitudinal central axis of the pulley 18 with respect to the housing 14. An air passage 20 extends through the pulley 18, and the air passage 20 intermittently receives compressed air from passage 40 in the shaft 12, by way of a passage 42 in the housing 14, to operate takeout tongs (not shown) that are attached to a flange 15 of the housing 14, the direction of air flow through the passage 20 being shown by the arrow A.

An annular drive gear 46 is rotatably mounted on the shaft 12, by way of the needle bearings 13, and the drive gear is connected to the housing 14 by a threaded fastener 48. The drive gear and the housing 14 are caused to oscillate about the axis of the shaft 12 by engagement with teeth 47 on the drive gear 46 by reciprocation of a toothed rack (not shown).

To maintain a fixed angular orientation of the takeout arm that is suspended from the flange 15, a pair of cables 24, 26 is tightly trained around the pulleys 16, 18 in the untoothed grooves on the periphery of each, the cables 24, 26 being spaced from each other along the turning axes of the pulley 16, 18. Thus, as the gear 46 turns to turn the housing 14, the cables 24, 26 will impart turning motion to the pulley 18 to turn it by an opposite angular degree the same as the angular degree by which the housing 14 is turned, to thereby avoid any turning of the takeout arm suspended from the flange 15 while the housing 14 is turning.

For proper pre-tensioning of the cables 24, 26, the pulley 16 is split along its turning axis into halves 16*a*, around which the cable 24 is trained, and 16*b*, around which the cable 26 is trained. The halves 16*a*, 16*b* are capable of being initially set up at slightly different angles of orientation with respect to one another to permit proper pre-tensioning of the cables 24, 26; in operation, however, the halves 16*a*, 16*b* turn with one another.

Figure 2:
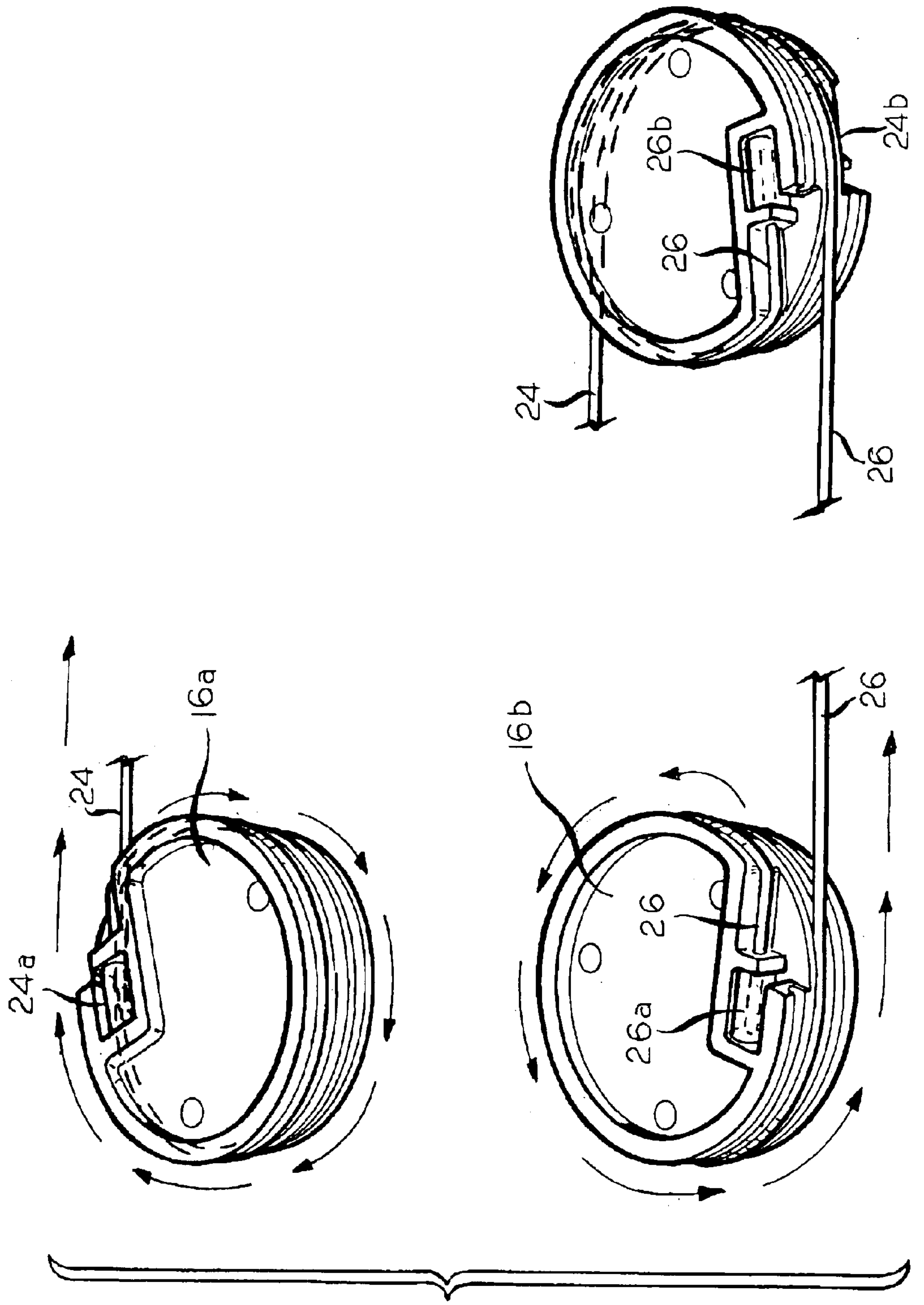
FIG. 2 is a fragmentary perspective view of the apparatus of FIG. 1.

As is shown in FIG. 2 each of the cables 24, 26 is doubled-ended with swaged opposed ends, including an end 24*a* of the cable 24 and end 26*a* of the cable 26, and an end of 24*b* of the cable 24 and end 26*b* of the cable 26, and the swaged ends are fixably secured to the pulley halves 16*a* or 16*b*, as the case may be, and to the pulley 18.

It has been found that 5/32 inch diameter, helically-wound, multi-strand steel cables are satisfactory for use in a parallel motion mechanism of a takeout assembly for a glass container forming machine of the I.S. type, even when operating temperatures to which such cables are exposed are substantially in excess of 185° F. Such cables are substantially lighter in weight and substantially less space-consuming than the belted parallel motion mechanisms that have heretofore been widely used for such purpose.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the following claims and legal equivalents thereof.

What is claimed:

1. Apparatus for transferring an article from a first position to a second position without varying an angular orientation of the article, said apparatus comprising, in combination:

a fixed shaft;

a housing journalled on said fixed shaft to be oscillatable with respect to said fixed shaft, a first pulley within said housing, said first pulley being coaxial with said fixed shaft and being oscillatable with said housing with respect to said fixed shaft, said first pulley having a plurality of untoothed grooves in an outer periphery and concentric with an axis of oscillation of said housing;

a second pulley within said housing and oscillatable with said housing, said second pulley being spaced from said first pulley and being rotatable with respect to said housing about a central axis of said second pulley, said central axis of said second pulley being parallel to the axis of oscillation of said first pulley;

a first cable trained around a first portion of said first pulley and a first portion of said second pulley;

a second cable trained around a second portion of said first pulley and a second portion of said second pulley;

said first portion of said first pulley and said second portion of said first pulley being spaced from one another about the axis of oscillation of said first pulley;

said first portion of said second pulley and said second portion of said second pulley being spaced from one another about said central axis of said second pulley; and, one of said first pulley and said second pulley being split with the first portion of said one of said first pulley and said second pulley and the second portion of said one of said first pulley and said second pulley being circumferentially adjustable relative to one another to permit independent adjustment of tension levels in said first cable and said second cable.

2. Apparatus according to claim 1 wherein:

said one of said first pulley and said second pulley is said first pulley.

3. Apparatus according to claim 2 wherein:

each of said first cable and said second cable is a double-ended cable one of whose opposed ends is secured to said first portion of said first pulley and said first portion of said second pulley, respectively, and the other of whose opposed ends is secured to said second portion of said first pulley and said second portion of said second pulley, respectively.

4. Apparatus according to claim 1 wherein:

said article is a freshly-formed glass container, said first position is a molding position of an I.S. glass container forming machine and said second position is a dead-plate of the I.S. glass container forming machine.

5. Apparatus according to claim 4 wherein:

said one of said first pulley and said second pulley is said first pulley.

6. Apparatus according to claim 5 wherein:

each of said first cable and said second cable is a double-ended cable one of whose opposed ends is secured to said first portion of said first pulley and said first portion of said second pulley, and the other of whose opposed ends is secured to said second portion of said first pulley and to said second portion of said second pulley, respectively.

7. Apparatus according to claim 6 wherein:

each of said first cable and said second cable has an outside diameter not substantially greater than 5/32 inch and is a multi-strand, helically-wound steel cable.

8. A method for providing a parallel motion to an article carried near an end of an arm that is oscillatable about an axis spaced from the end to prevent varying of an angular position of the article during oscillation of the arm, the method comprising:

providing a first pulley with an untoothed groove periphery, the first pulley being coaxial with the axis of oscillation of the arm, the pulley being oscillatable with the arm;

providing a second pulley with an untoothed groove periphery, the second pulley being spaced from the first pulley, the second pulley being oscillatable with the arm and rotatable with respect to the arm about an axis of spaced from the axis of oscillation on the arm;

training a first double-ended cable around a first portion of the first pulley and a first portion of the second pulley in a groove of the first portion of the first pulley and a groove of the first portion of the second pulley;

training a second cable around a second portion of the first pulley and a second portion of the second pulley in a groove of the second portion of the first pulley and a groove of the second portion of the second pulley;

securing opposed ends of said first cable to one of the first portion of said first pulley and said first portion of said second pulley;

securing opposed ends of said second cable to one of the second portion of the first pulley and the second portion of the second pulley; and adjusting tension levels in the first and second cables by circumferentially varying the first portion of the one of the first pulley and the second pulley and the second portion of the one of the first pulley and the second pulley with respect to one another.

9. The method according to claim 8 wherein:

the one of the first pulley and the second pulley is the first pulley.

10. The method according to claim 9 wherein:

each of the first cable and the second cable is a helically-wound, multi-strand steel cable.

11. The method according to claim 10 comprising:

operating the arm in an environment where the temperature exceeds 185° F.

12. The method according to claim 11 wherein the temperature is at least 225° F.

* * * * *